(12) United States Patent
Scheurenbrand et al.

(10) Patent No.: US 6,182,941 B1
(45) Date of Patent: Feb. 6, 2001

(54) MICRO-VALVE WITH CAPACITOR PLATE POSITION DETECTOR

(75) Inventors: Hans Scheurenbrand, Kernen; Peter Post, Nellingen-Ostfildern; Herbert Vollmer, Notzingen; Michael Weinmann, Plüderhausen, all of (DE)

(73) Assignee: Festo AG & Co., Esslingen (DE)

( * ) Notice: Under 35 U.S.C. 154(b), the term of this patent shall be extended for 0 days.

(21) Appl. No.: 09/426,856

(22) Filed: Oct. 26, 1999

(30) Foreign Application Priority Data

Oct. 28, 1998 (DE) .............................................. 198 49 700

(51) Int. Cl.$^7$ .............................. F16K 31/02; F16K 37/00
(52) U.S. Cl. ................... 251/129.04; 251/129.01; 137/554
(58) Field of Search .................. 251/129.01, 129.04, 251/129.07, 331; 137/554

(56) References Cited

U.S. PATENT DOCUMENTS

| | | | |
|---|---|---|---|
| 4,826,131 | * | 5/1989 | Mikkor ........................ 251/129.07 X |
| 5,065,978 | * | 11/1991 | Albarda et al. ................... 251/331 X |
| 5,216,273 | * | 6/1993 | Doering et al. ............. 251/129.01 X |
| 5,323,999 | * | 6/1994 | Bonne et al. ................ 251/129.01 X |
| 5,566,703 | * | 10/1996 | Watanabe et al. .......... 251/129.06 X |
| 5,855,850 | * | 1/1999 | Sittler ..................................... 422/98 |
| 5,870,007 | * | 2/1999 | Carr et al. ............................. 333/262 |

FOREIGN PATENT DOCUMENTS

| | | |
|---|---|---|
| 38 09 597 A1 | 10/1989 | (DE) . |
| 39 13 678 C1 | 7/1990 | (DE) . |
| 196 50 116 C1 | 4/1998 | (DE) . |
| 197 44 292 A1 | 4/1998 | (DE) . |
| 0 485 739 A1 | 5/1992 | (EP) . |

* cited by examiner

Primary Examiner—Kevin Shaver
Assistant Examiner—Eric Keasel
(74) Attorney, Agent, or Firm—Hoffmann & Baron, LLP

(57) ABSTRACT

A micro-valve arrangement whose micro-valve has a housing containing two opposite housing layers, between which a valve chamber is delimited, wherein a valve member is located. A fluid duct extending in one housing layer opens into the valve chamber and is controlled by the valve member. By means of an electrically operated actuator it is possible for the position of the valve member to be predetermined. Furthermore a position detector is present, which on the basis of the measured capacitance of a capacitor renders it possible to find the position of the valve member. This capacitor comprises two capacitor faces which are provided opposite to each other in the direction of motion of the valve member and on one of the housing layers.

8 Claims, 1 Drawing Sheet

MICRO-VALVE WITH CAPACITOR PLATE POSITION DETECTOR

BACKGROUND OF THE INVENTION

The invention relates to a micro-valve arrangement comprising a micro-valve which has a housing produced in by a micro-structuring method, such housing having two mutually opposite housing layers, between which a valve chamber is defined, in which a diaphragm- or plate-like valve member is located, at least one of the two housing layers having at least one fluid duct extending therein, such duct opening opposite to the valve member at a port, in controlling cooperation with the valve member, into the valve chamber, and an electrical actuator for presetting the relative position of the valve member in relation to the duct port.

A micro-valve arrangement of this type is for example disclosed in the European patent publication 0 485 739 A1.

It comprises a micro-valve with a multi-layer housing, which is produced by a micro-structuring method. A valve member, whose structure is produced from a middle layer housing layer, is located in a valve chamber defined between two further housing layers and may be operated with the aid of an electrostatic actuator. In at least one of the outer housing layers a fluid duct extends, which so opens into the valve chamber that its duct port is opposite to the valve member. By means of the actuator the valve member can be shifted between a closed position covering the duct port and an open position clear of the duct port in which it is at a greater distance from the duct port.

For many applications of micro-valves it would be convenient to obtain information as regards the current position of switching and consequently the current position of the valve member. Although it would in principle be possible to find the position of switching of the micro-valve on the basis of the state of operation of the actuator, in the event of possible improper functioning of the micro-valve there is no guarantee that the state of the operation of the actuator and the state of switching of the valve member do in fact comply with one another. Although it would be feasible to provide for direct detection of the position of the valve member with the aid of a sensor arranged externally on the housing, this would generally be likely to prevent designs with a extremely small overall size of the micro-valve.

SUMMARY OF THE INVENTION

One object of the invention is to provide a micro-valve arrangement of the type initially mentioned, with which reliable information may be obtained about the position of the valve member.

In order to achieve these and/or other objects appearing from the present specification, claims and drawings, in the present invention the micro-valve comprises a position finding means for finding the position of the valve member on the basis of the measured capacitance of a capacitor, such capacitor comprising two capacitor faces which are opposite to each other in the direction of motion of the valve member and are respectively provided on the valve member and on one of the housing layers.

It is in this manner that the micro-valve is provided with a position finding means, whose principal components are able to be integrated in the micro-valve in the form of the capacitor faces. Since the measured capacitance is a function of the distance between the two capacitor faces, it is possible to derive from this the actual distance between the valve member and the duct port in controlling cooperation therewith in a simple fashion and thus to find the position of the valve member. Thus there is an extremely simple and reliable way of monitoring the switching state of the micro-valve. Moreover it is possible for the measured capacitance to be employed when required as a regulation signal or quantity in order in connection with a suitable control means to perform the necessary positioning of the valve member in a manner dependent on the desired pressure and/or flow rate, such positioning being more particularly in connection with continuous action of the micro-valve.

Further advantageous developments of the invention are defined in the claims.

In the case of a particularly simple design the capacitor faces are directly formed by the electrode faces of an electrostatic actuator. This renders the separate provision of capacitor faces unnecessary, since the electrode faces present in any case for the operation of the valve member may be employed with a double function as capacitor faces as well. However in certain conditions it may also be advantageous as well to design the capacitor and the electrostatic actuator separately and independent of each other, the capacitor faces on the one hand and the electrode faces on the other hand being more especially provided on opposite sides of the valve member.

In order to measure the capacitance of the capacitor, the micro-valve arrangement is preferably provided with a suitable capacitance measuring means. Its principle of operation may for example be based on the application of AC to the capacitor faces and finding the current which flows.

In order to be able to design for variable output pressures and/or rates of flow with the micro-valve arrangement the micro-valve is preferably in the form of a continuous action valve and in this respect more particularly as a proportional valve. In this case the actuator may be provided with a voltage source with a variably adjustable output value so that the instantaneous relative position between the valve member and the associated duct port is dependent on the currently set output voltage.

A micro-valve designed in the form of a continuous action micro-valve is suitable more especially for use in regulated operation. For this purpose a regulating means may be provided, which provides a control signal on the basis of the measured capacitance as the true or actual value and a predeterminable target value, such control signal being utilized for the operation of the actuator and permitting a variable position of the valve member in a manner dependent on the current control signal. The target value may for instance correspond to a pressure or rate of flow value desired on the output side of the micro-valve. In this respect it is advantageous that as a rule it is possible to dispense with the use of additional pressure and/or flow rate sensors so that a low price regulation system is possible.

Further advantageous developments and convenient forms of the invention will be understood from the following detailed descriptive disclosure of one embodiment thereof in conjunction with the single figure of the accompanying drawing. The drawing shows a preferred design of the micro-valve arranged in accordance with the invention, the micro-valve itself being shown in cross section and in conjunction with an associated regulator means.

DETAILED DESCRIPTION OF THE INVENTION

Figure 1:
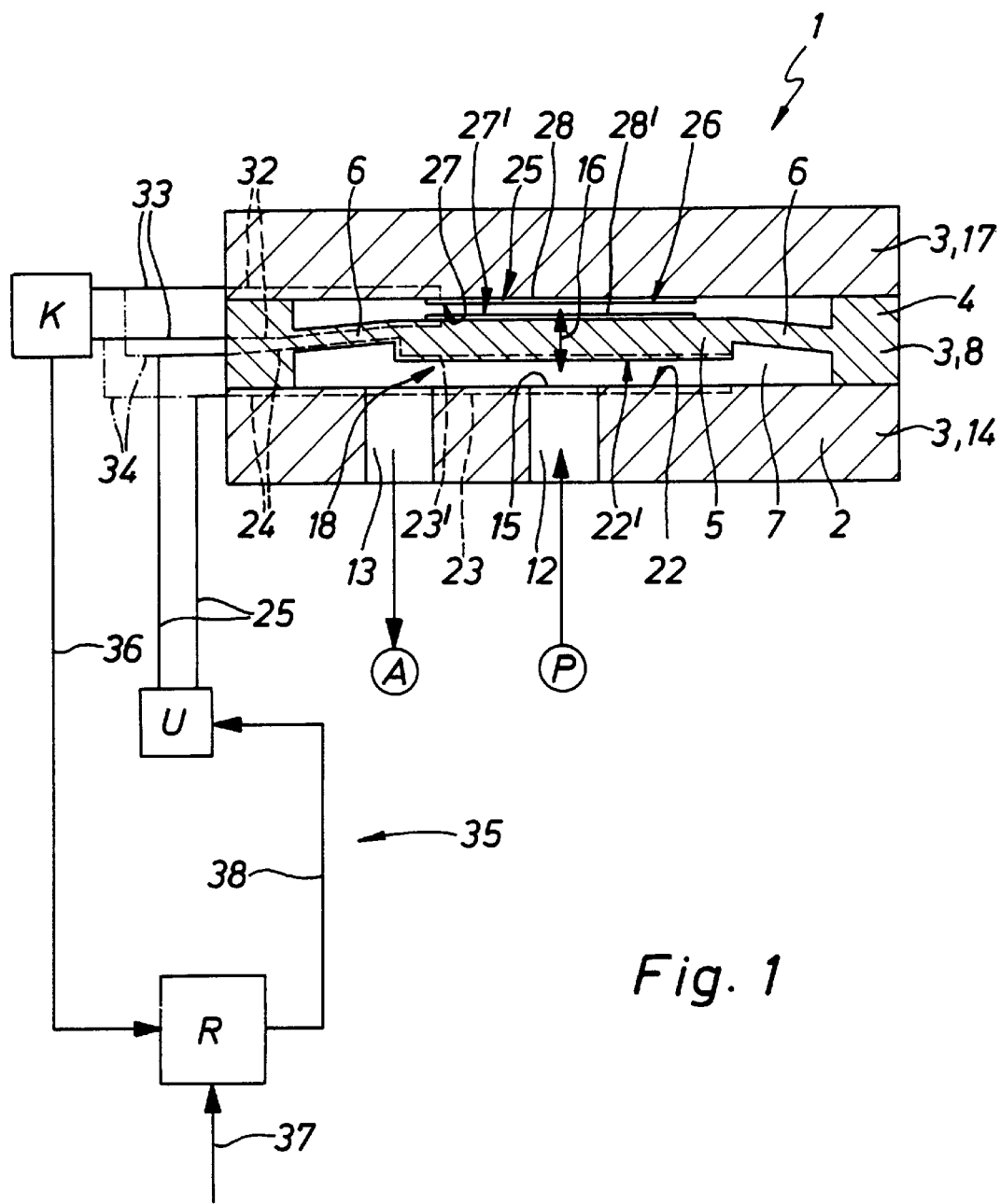
FIG. 1 is a micro-valve with a capacitor plate position detector.

In the case of the valve illustrated on an extremely large scale diagrammatically it is a question of a valve of the micro-mechanical type, which is produced by microstructuring and is consequently referred to a micro-valve 1. It possesses a housing 2 in a multi-layer design, which comprises a plurality of flatwise stacked housing layers 3 which as a rule are permanently bonded together in a fluid-tight fashion. The number of the housing layers 3 is varied in accordance with the desired valve type, the working embodiment having three tabular housing layers 3.

The two external housing layers 3 arranged at the top and at the bottom delimit a valve chamber 7 between them. Their lateral limit is in the form of a frame-like surrounding marginal region 4 of the middle housing layer 3, from which furthermore a diaphragm-like or tabular valve seat 5 is microstructured, which is surrounded by the frame-like marginal region 4 and is connected with the same by preferably resiliently elastic suspension ribs 6. The valve member 5 is therefore arranged in the valve chamber 7.

To provide for better distinction the housing layer 3 containing the valve member 5 will be termed the valve member layer 8.

In the external housing layer 3, which in the working embodiment is at the bottom, there extend a plurality of fluid ducts 12 and 13, for which reason it will be termed the duct layer 14. It is a question in the working example of two fluid ducts, which both open at one end into the valve chamber 7, at least the duct port 15 of the one, first fluid duct 12 being opposite to the valve member 5. The first fluid duct 12 is provided in the working example to be connected at the other end with a pressure source P so that it may also be termed a feed duct.

In the illustrated working embodiment the other, second fluid duct 13 constitutes a power duct, which may be connected with a load A.

The duct port 15 of the first fluid duct 12 is for controlling cooperation with the valve member 5. The latter is so mounted in a movable manner by means of the suspension ribs 6 that it may be shifted in a direction 16 of movement indicated by the double arrow at a right angle to the plane of extension of the individual housing layers 3. In this respect it can be moved between open positions at a greater or less distance from the duct layer 14 and the duct port 15 provided thereon and a closed position in engagement with the duct layer 14 to shut off or cover over the duct port 15 in a fluid-tight fashion. In the drawing one possible open position is illustrated.

In the open positions pressure medium supplied via the first fluid duct 12 and more especially compressed air may flow right through the valve chamber 7 to the second fluid duct 13 and consequently to a load connected with the valve. In the closed position the fluid connection is interrupted.

The micro-valve 1 in the present example is designed in the form of a 2/2 way valve. The housing layer 3 illustrated in the drawing on the top is in this case in the form a duct-free covering layer 17. However it would certainly be possible to have a design with more valve functions as for example a 3/2 way valve, in which case in lieu of the covering layer 17 a duct layer of suitable design could also be provided.

More especially in a manner dependent on the selected method of manufacture, as for instance an etching or molding technique, the housing the l layers 3 will consist of, more particularly, semiconductor material and/or plastic material.

The instantaneous relative position existing between the valve member 5 and the duct port 15 and hence the switching state of the micro-valve 1 is predetermined by an electrically operated actuator 18. In the working embodiment the design is such that when the actuator is not activated the position is an open one, this being permitted for example by the resilient suspension ribs 6 and furthermore is caused by the pressure medium in the first fluid duct 12. When on the other hand the actuator 18 is on the valve member 5 will be pulled toward the duct port 15, in the present case the degree of activation of the actuator 18 being a way of influencing whether the closed position is produced or whether an intermediate position is produced which is between the closed position and the maximum open position. Thus it is a question in the case of the micro-valve 1 of the working example of a so-called continuous action valve and more particularly of a proportional valve, which permits stepless presetting of the flow cross section available for the pressure medium. Accordingly the pressure and/or flow rate at the second fluid duct 13 may be variably set.

The actuator 18 may be of any suitable design. It could for instance be electromagnetic. Particularly compact dimensions coupled with a particularly advantageous possibility of integration in the housing 2 are however rendered possible by the design in the example as an electrostatic actuator. For this purpose on the mutually facing sides of the duct layer 14 and of the valve member 5 there is in each case an electrode face 22 and 22', which is respectively constituted by a sheet-like and electrically conductive, thin layer-like electrode 23 and 23'. The latter are connected with internal electrical conductors 24 leading to the outer face of the housing, a voltage or power source U being connected therewith by way of external electrical conductors 25.

The power source U supplies a variably adjustable output voltage, which is applied to the two electrodes 23 and 23' so that an electrostatic field is formed between the electrode faces 22 and 22' thereof, whose strength will be dependent on the level of the DC applied, the valve member 5 being drawn toward the duct layer 14 in a manner dependent on the field strength. Accordingly the instantaneous distance between the valve member 5 and the duct port 15 or, respectively, the associated duct layer 14 is a function of the applied output voltage of the power source U.

The electrodes 23 and 23' may furthermore be directly formed on the surface of the valve member 5 and/or of the duct layer 14, if the respective zones are rendered electrically conductive and between the two housing layers 3 electrical insulation is provided.

The micro-valve 1 is furthermore provided with a position finding or detecting means, which renders it I possible to find the instantaneous position of the valve member 5 in relation to the duct port 15 controlled by it. An important component of this position finding means 25 is a capacitor 26, which is on the side of the valve member 5 which is opposite to the electrical actuator in the direction 16 of motion. It comprises two capacitor faces 27 and 27' which are opposite to one another in the direction 16 of movement, the one capacitor face 27 being on the inner face, turned toward the valve chamber 7 of the covering layer 17 and the other capacitor face 27' being present on the outer face, turned toward the covering layer 17, of the valve member 5.

In the working embodiment the capacitor faces 27 and 27' are on thin capacitor plates 28 and 28', which are more especially provided as a sort of coating on the above mentioned faces of the covering layer 17 and of the valve member 5. However in a manner similar to the description of the electrodes 23 and 23' it would be readily possible for the capacitor faces 27 and 27' to be provided directly on the associated components.

The capacitor faces 27 and 27' are connected with the electrical conductors 32, arranged inside the housing 2 and leading to the outer face thereof. Such conductors are for their part in the working example connected with a capacitance measuring means K via external electrical conductors 33. The capacitance measuring means renders possible a more particularly continuous or quasi continuous measurement of the capacitance of the capacitor 26, which is dependent on the distance apart of the two capacitor faces 27 and 27'. The measurement of capacitance may for example be performed by the application of AC to the capacitor plates 28 and 28' by means of the capacitance measuring means K and finding the resulting the current by means of the capacitance measuring means K.

Since the distance between the two capacitor faces 27 and 27' is dependent on the position of the valve member 5 as predetermined by the actuator 18, there will be a direct dependence of the measured capacitance on the position of the valve member 5 and accordingly on the distance between this valve member 5 and the duct port 15 for cooperation with it. Thus while keeping to extremely compact dimensions an extremely precise detection of position of the valve member 5 is possible.

The separate design of the actuator 18 and of the capacitor 26 offers the advantage in the working example of preventing mutual interference in measuring. However it is in this connection to be ensured that the electrical force effects in the measured capacitance have a substantially smaller effect on the valve member than the actuator forces produced.

In the case of an alternative design the capacitor faces 27 and 27' are formed directly by the electrode faces 22 and 22' of the electrostatic actuator 18. It is in this manner that the fitting of the micro-valve 1 with a single pair of electrodes is sufficient. The electrodes 23 and 23' would in this case be connected as indicated in chained lines by the conductor 34 not only with the power source U but also with the capacitance measuring means K, opposite influences or interference being prevented substantially because RF AC is employed in the capacitance measuring means K.

While the micro-valve 1 of the working example is a continuous action or, respectively, proportional valve, it is to be noted that the position finding means 25 may also be utilized in the case of other sorts of valves with different operational characteristics and more especially for valves, which at least at a certain proximity of the valve member 5 to the duct layer 14 lead to a sudden switching over.

In any case it is possible for the capacitance, which becomes established at the capacitor 26, to be employed as a criterion for the opening of the valve. This means that the micro-valve may be readily included in an automatic control circuit, for instance for flow rate or pressure. In the working embodiment such a form of regulation device is illustrated, the capacitance measuring means K and the voltage source U being included in a regulating means 35, which as a further component has a regulator R.

The capacitance found by the capacitance measuring means K is supplied as indicated by the arrow 36 as the actual or true value input to the regulator R, to which as indicated by the arrow 37 a preselectable target value may be supplied.

On the basis of true and target values to be compared with each-other the regulator R supplies a control signal as indicated by the arrow 38, which is supplied to the voltage or power supply U, which in turn supplies a variable output voltage, dependent on the control signal, for the operation of the actuator 18.

The pressure and/or flow rate values at the second fluid duct 13 will be dependent on the degree of opening of the micro-valve 1, which can be found by measuring capacitance. It is in this manner that it is possible, dependent on the particular case, to perform regulation of pressure and/or flow rate, the distance signal comprised in the measured capacitance in relation to the distance between the valve member 5 and the duct port being employed as a regulation signal or quantity. It is therefore in many case possible to dispense with additional pressure or volume sensors or, respectively, rate of flow measuring means, something which renders possible a low cost design of the micro-valve arrangement.

What is claimed is:

1. A micro-valve arrangement comprising a micro-valve which has a housing produced by a micro-structuring method, such housing having two mutually opposite housing layers, between which a valve chamber is defined, in which a diaphragm- or plate-like valve member is located, at least one of the two housing layers having at least one fluid duct extending therein, such duct opening opposite to the valve member at a port, in controlling cooperation with the valve member, into the valve chamber, and an electrical actuator for presetting the relative position of the valve member in relation to the duct port, wherein the micro-valve comprises a position finding means for finding the position of the valve member on the basis of the measured capacitance of a capacitor, such capacitor comprising two capacitor faces which are opposite to each other in the direction of motion of the valve member and are respectively provided on the valve member and on one of the housing layers.

2. The micro-valve arrangement as set forth in claim 1, wherein the capacitor faces are directly constituted by the electrode faces of an electrostatic actuator.

3. The micro-valve arrangement as set forth in claim 1, wherein the capacitor with its two capacitor faces is designed separately from an electrostatic actuator having two electrode faces.

4. The micro-valve arrangement as set forth in claim 3, wherein the capacitor and the electrostatic actuator are associated with opposite sides of the valve member.

5. The micro-valve arrangement as set forth in claim 1, wherein the two capacitor faces are connected with a capacitance measuring means for measuring such capacitance.

6. The micro-valve arrangement as set forth in claim 1, wherein the micro-valve is designed as a continuous action valve, a power source with a variably adjustable output voltage being associated with the actuator, and the instantaneous position between the valve member and the associated duct port being dependent on the currently set output voltage.

7. The micro-valve arrangement as set forth in claim 1, further comprising a regulation means which on the basis of the measured capacitance as a true value and of a preselectable target value supplies a control signal for the operation of the actuator.

8. The micro-valve arrangement as set forth in claim 7, wherein the micro-valve is designed as a continuous action valve, a power source with a variably adjustable output voltage being associated with the actuator, and the instantaneous position between the valve member and the associated duct port being dependent on the currently set output voltage and wherein the control signal acts on the power source, which supplies an output voltage dependent on the control signal.

* * * * *